C. N. Brock.
Water Filter,
No 39,031.      Patented June 30, 1863.
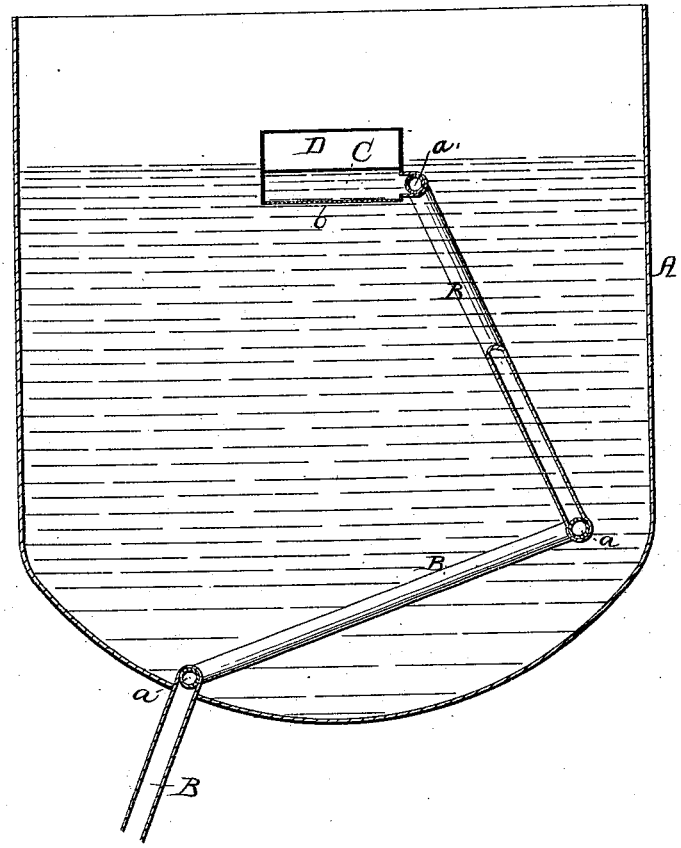
Witnesses:
J. W. Coombs
G. W. Reed
Inventor;
C. N. Brock
per Munn & Co
Attorneys

UNITED STATES PATENT OFFICE.

CHARLES N. BROCK, OF PHILADELPHIA, PENNSYLVANIA.

IMPROVED SIPHON-FILTER FOR DRAWING SIRUPS, &c.

Specification forming part of Letters Patent No. 39,031, dated June 30, 1863.

*To all whom it may concern:*

Be it known that I, CHARLES N. BROCK, of the city of Philadelphia, in the county of Philadelphia and State of Pennsylvania, have invented a new and useful apparatus, which I term a "Siphon-Filter," for emptying the blow-up pans used in the manufacture of sugar; and I do hereby declare that the following is a full, clear, and exact description of the same, reference being had to the accompanying drawing, forming part of this specification, said drawing representing a central vertical section of a "blow-up pan" with the siphon-filter applied.

The usual mode of emptying a blow-up pan is to melt the sugar in the pan and draw the sirup or liquor at or near the bottom through a strainer, thus first drawing off the dirt.

The object of my invention is to draw off the sirup or liquor from the surface, where it is clear, and allow the dirt to settle at the bottom of the pan, to be shoveled out after the sirup or liquor has been all discharged; and to this end it consists in a flexible pipe or a pipe with flexible or folding joints, with an outlet through the bottom of the pan, and with a float and strainer at the top, the float remaining at the top of the sirup or liquor and keeping the strainer just below the surface thereof, and the pipe connecting with the strainer in such manner that the sirup or liquor passes through the strainer before entering the pipe.

To enable others skilled in the art to make and use my invention, I will proceed to describe the construction and operation.

A is the pan. B is the pipe, (represented as made of metal,) with flexible elbow-joints *a a a*, its lower part passing through the bottom of the pan, and its upper end being secured to the strainer C, above the bottom *b* thereof. D is the float, having the drawer C attached to its bottom. The whole of the strainer is submerged in the sirup or liquor, (tinted red in the drawing;) but as it is made very shallow its bottom *b*, made of wire-cloth or other reticulated material, is kept by the float at a short distance from the surface. The pipe B is to be furnished with a stop-cock at a convenient distance below the bottom of the pan, and when the sirup or liquid is to be drawn off this stop-cock is opened, and the sirup or liquid passes into the strainer through the bottom *b*, and thence down the pipe B through the bottom of the pan to the outlet. As the sirup or liquid is drawn off, and the float and strainer descend, the pipe B folds up, and when all has been drawn off the dirt is removed from the bottom of the pan by shovels or other means.

The siphon-filter is applicable to the emptying of other vessels than the blow-up pans.

What I claim as my invention, and desire to secure by Letters Patent, is—

Having the filter or filtering-drawer C constructed with the float D immediately above it, in combination with the jointed pipe B, all in the manner herein shown and described.

CHARLES N. BROCK.

Witnesses:
THOS. F. BROCK,
CHAS. HENRY BROCK.